US012665808B2

(12) United States Patent
Hanif et al.

(10) Patent No.: US 12,665,808 B2
(45) Date of Patent: Jun. 23, 2026

(54) STORAGE DEVICE SWAP IN A MULTIPLE COMPUTING CLUSTER ENVIRONMENT USING CROSS SYSTEM COMMUNICATION

(71) Applicant: INTERNATIONAL BUSINESS MACHINES CORPORATION, Armonk, NY (US)

(72) Inventors: Tariq Hanif, Lagrangeville, NY (US); Tabor R. Powelson, Poughkeepsie, NY (US); Dale F Riedy, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/537,196

(22) Filed: Dec. 12, 2023

(65) Prior Publication Data
US 2025/0193074 A1 Jun. 12, 2025

(51) Int. Cl.
*H04L 41/0816* (2022.01)

(52) U.S. Cl.
CPC ................................ *H04L 41/0816* (2013.01)

(58) Field of Classification Search
None
See application file for complete search history.

(56) References Cited

U.S. PATENT DOCUMENTS

| | | | |
|---|---|---|---|
| 7,043,665 B2 | 5/2006 | Kern et al. | |
| 8,027,952 B2 | 9/2011 | Kern et al. | |
| 9,298,567 B2 | 3/2016 | Blea et al. | |
| 9,891,849 B2 | 2/2018 | Crawford et al. | |
| 10,846,187 B2 | 11/2020 | Blea et al. | |
| 10,977,142 B2 | 4/2021 | Blea et al. | |
| 2006/0112244 A1* | 5/2006 | Buah ................... | G06F 11/2069 711/162 |
| 2014/0258659 A1* | 9/2014 | Petersen .............. | G06F 3/0622 711/162 |
| 2019/0384535 A1 | 12/2019 | Compton et al. | |
| 2021/0157486 A1* | 5/2021 | Masuda ............... | G06F 3/0611 |
| 2023/0305727 A1* | 9/2023 | Blea ..................... | G06F 3/0665 |

\* cited by examiner

*Primary Examiner* — Scott B Christensen
(74) *Attorney, Agent, or Firm* — Onyx IP Group

(57) ABSTRACT

Storage device swap in a multiple computing cluster environment using cross system communication includes sending, by a first host device of a first computing cluster of a plurality of computing clusters, a swap trigger command to one or more storage devices shared across the plurality of computing clusters indicating that a swap event is to be triggered. The swap trigger command identifies the one or more storage devices to participate in the swap event. The first host device receives a signal to trigger the swap event from a storage controller associated with the one or more storage devices, a signal to trigger the swap event.

20 Claims, 8 Drawing Sheets

Send, By A First Host Device Of A First Computing Cluster Of A Plurality Of Computing Clusters, A Swap Trigger Command To One Or More Storage Devices Shared Across The Plurality Of Computing Clusters Indicating That A Swap Event Is To Be Triggered, The Swap Trigger Command Identifying The One Or More Storage Devices To Participate In The Swap Event
702

Receive, By The First Host Device From A Storage Controller Associated With The One Or More Storage Devices, A Signal To Trigger The Swap Event
704

100

200

Figure 6:
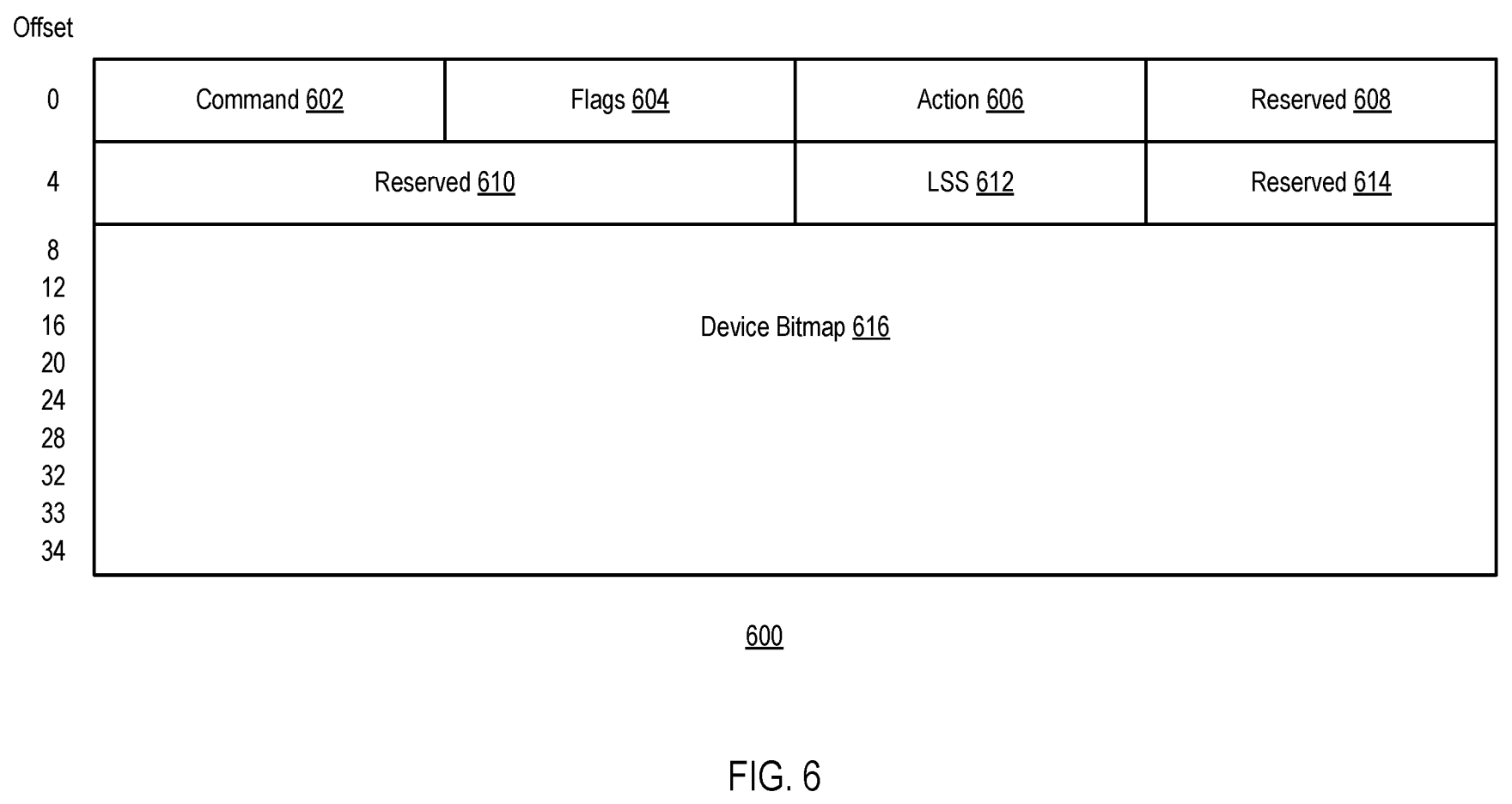

| Offset | | | | |
|---|---|---|---|---|
| 0 | Command 602 | Flags 604 | Action 606 | Reserved 608 |
| 4 | Reserved 610 | | LSS 612 | Reserved 614 |
| 8 | | | | |
| 12 | | | | |
| 16 | | | | |
| 20 | Device Bitmap 616 | | | |
| 24 | | | | |
| 28 | | | | |
| 32 | | | | |
| 33 | | | | |
| 34 | | | | |

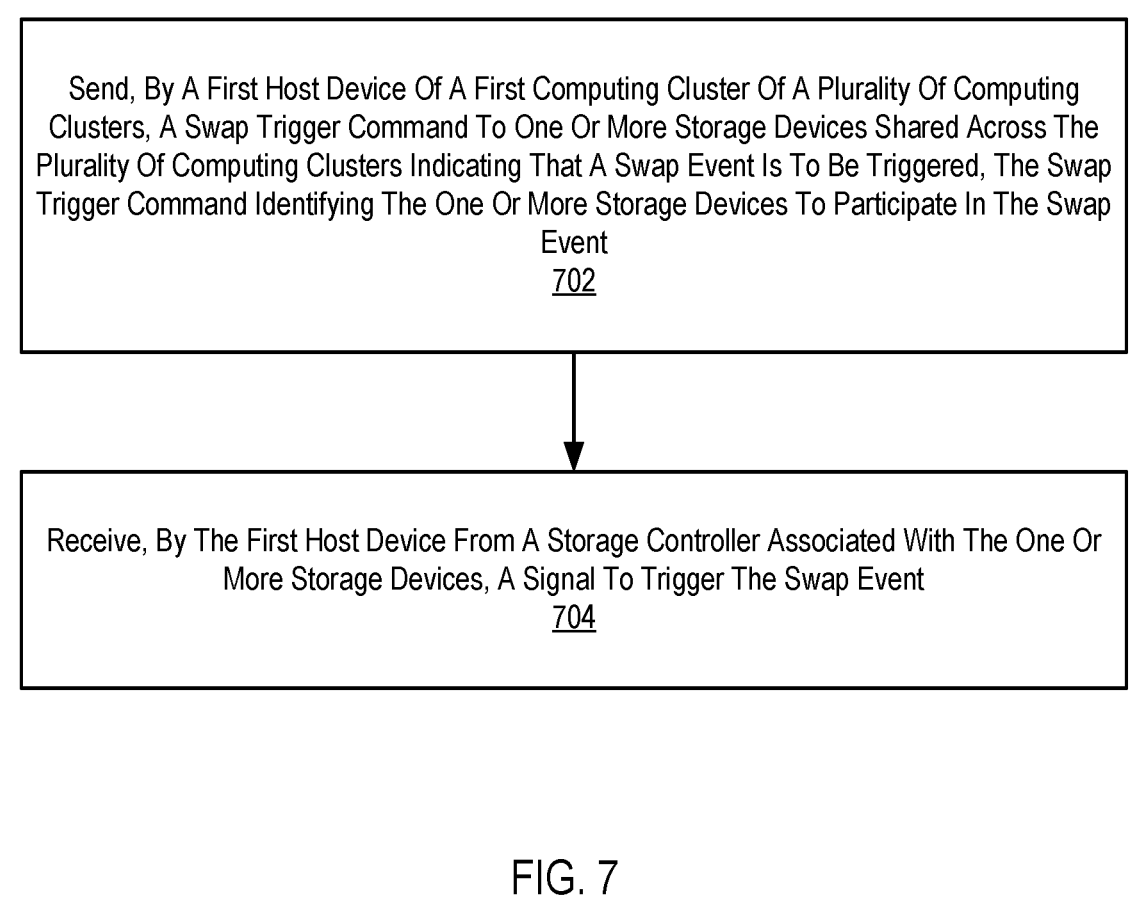

Send, By A First Host Device Of A First Computing Cluster Of A Plurality Of Computing Clusters, A Swap Trigger Command To One Or More Storage Devices Shared Across The Plurality Of Computing Clusters Indicating That A Swap Event Is To Be Triggered, The Swap Trigger Command Identifying The One Or More Storage Devices To Participate In The Swap Event
702

Receive, By The First Host Device From A Storage Controller Associated With The One Or More Storage Devices, A Signal To Trigger The Swap Event
704

FIG. 7

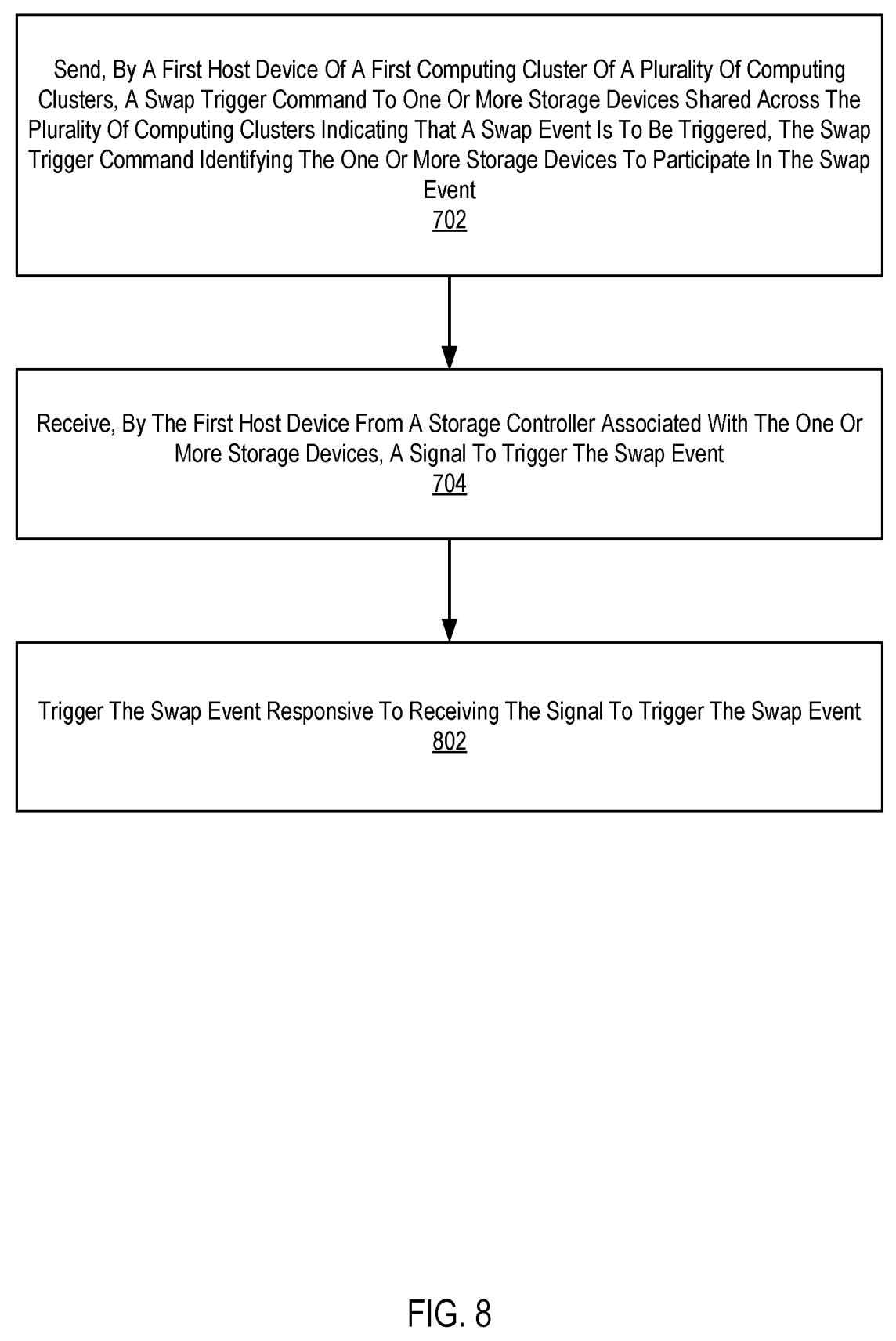

Send, By A First Host Device Of A First Computing Cluster Of A Plurality Of Computing Clusters, A Swap Trigger Command To One Or More Storage Devices Shared Across The Plurality Of Computing Clusters Indicating That A Swap Event Is To Be Triggered, The Swap Trigger Command Identifying The One Or More Storage Devices To Participate In The Swap Event
702

Receive, By The First Host Device From A Storage Controller Associated With The One Or More Storage Devices, A Signal To Trigger The Swap Event
704

Trigger The Swap Event Responsive To Receiving The Signal To Trigger The Swap Event
802

FIG. 8

STORAGE DEVICE SWAP IN A MULTIPLE COMPUTING CLUSTER ENVIRONMENT USING CROSS SYSTEM COMMUNICATION

BACKGROUND

The present disclosure relates to methods, apparatus, and products for storage device swap in a multiple computing cluster environment using cross system communication.

SUMMARY

According to embodiments of the present disclosure, various methods, apparatus and products for storage device swap in a multiple computing cluster environment using cross system communication are described herein. In some aspects, storage device swap in a multiple computing cluster environment using cross system communication includes sending, by a first host device of a first computing cluster of a plurality of computing clusters, a swap trigger command to one or more storage devices shared across the plurality of computing clusters indicating that a swap event is to be triggered. The swap trigger command identifies the one or more storage devices to participate in the swap event. The first host device receives a signal to trigger the swap event from a storage controller associated with the one or more storage devices, a signal to trigger the swap event.

BRIEF DESCRIPTION OF THE DRAWINGS

FIG. 6 sets forth an example set swap trigger command according to aspects of the present disclosure.

FIG. 7 sets forth a flowchart of an example process for storage device swap in a multiple computing cluster environment using cross system communication according to aspects of the present disclosure.

FIG. 8 sets forth a flowchart of another example process for storage device swap in a multiple computing cluster environment using cross system communication according to aspects of the present disclosure.

DETAILED DESCRIPTION

Figure 1:
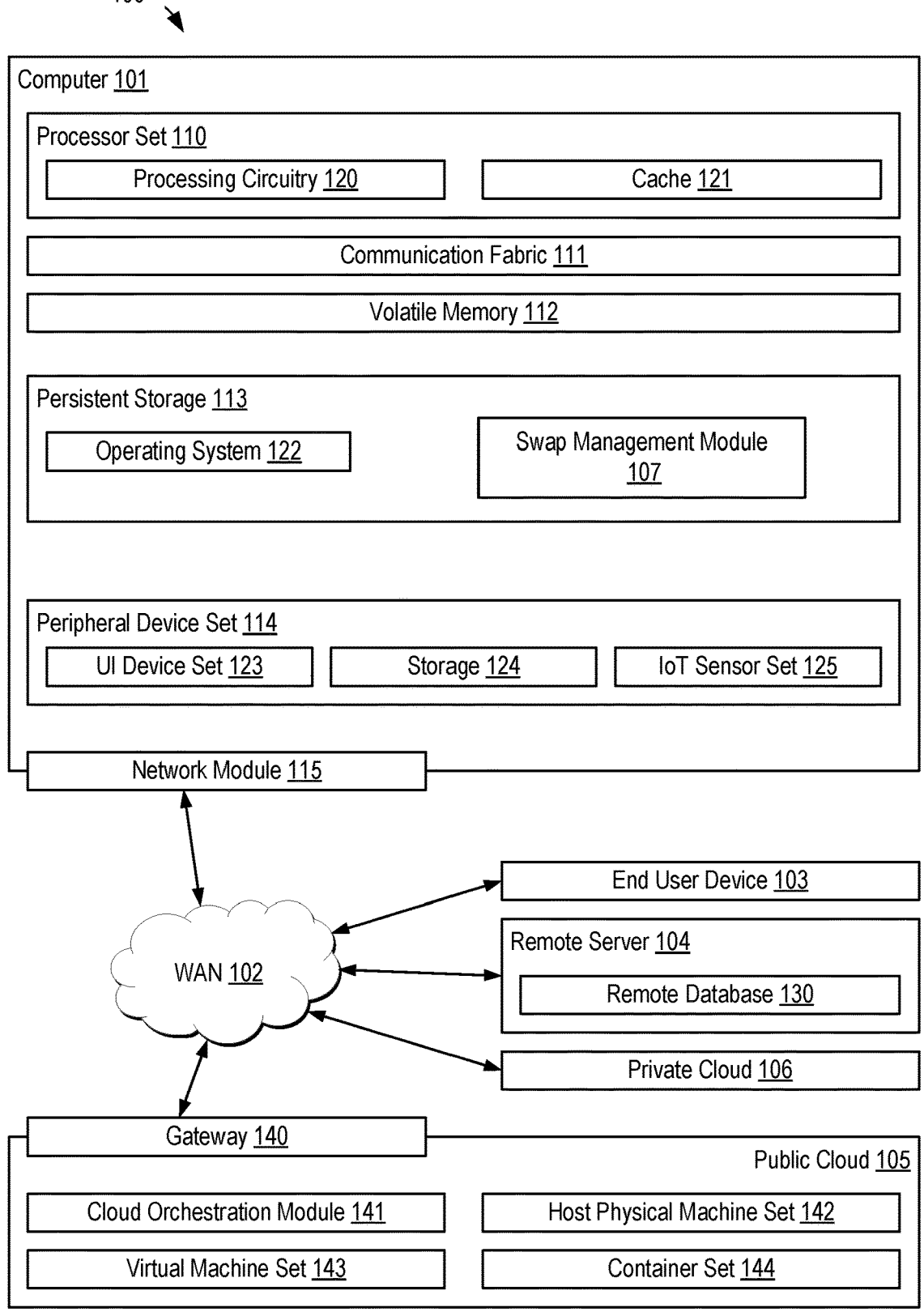
FIG. 1 sets forth an example computing environment according to aspects of the present disclosure.

A computing system is often in communication over a network with one or more storage systems for storing and accessing data used during operation of the computing system. The different storage systems are often located in different geographical locations. Each storage system typically includes one or more storage devices (e.g., disk drives) controlled by a storage controller. Storage replication allows for maintaining redundant copies of data on two different storage systems to allow for continuous availability in the event of a failure of one of the storage systems. Switching from usage of one storage system to another storage system is often referred to as a swap event. The switching from one storage system to another storage system in the event of a failure of the storage system is often referred to as an unplanned swap event. An example of an operating system including such swap capability is the HyperSwap function provided by the z/OS operating system offered by International Business Machines™. A sysplex refers to a computing cluster of independent instances of an operating system. The HyperSwap function provides for continuous availability in the event of disk failures by maintaining synchronous copies of all primary disk volumes on one or more secondary storage controllers. During data replication, data is copied from a source volume to one or more target volumes. The source volume and target volumes that contain copies of the same data are collectively referred to as a copy set. Disk failures can be hidden from applications by the HyperSwap function automatically swapping form one set of disk volumes to another as a result of triggering a swap event.

Peer-to-peer remote copy (PPRC) is a protocol used to replicate a primary storage volume to a secondary storage volume. The primary storage volume and secondary storage volume are often connected together through a communication link called a PPRC path. To facilitate configuration of storage devices, a storage device partitions its possible logical volumes into groups of volumes. Each group of volumes is referred to as a logical subsystem (LSS). An LSS is uniquely identified within the storage system by an LSS identifier that typically is a numerical value. To establish remote mirror and copy pairs, a logical path is established between the associated LSS pair.

In a swap environment (e.g., a HyperSwap environment) with storage devices shared across multiple computing clusters (e.g., sysplexes), a need exists for each computing cluster to be aware when another computing cluster has swapped. This need especially exists for a system which allow each computing cluster to utilize independent swap sessions, and/or each swap session is on a sysplex basis which communicate with each other only through the shared storage devices. In existing procedures when one session/sysplex swaps, the other session/sysplex is triggered to swap by the first session soft fencing the shared devices, receives a soft fence unit check, and automatically swaps. Soft fencing prevents unintended access to the storage device by preventing most I/O operations (e.g., reading and writing data) to the storage device.

However, if there is no or little I/O activity on the shared storage device, the swap may not occur immediately. For example, if I/O activity to some other non-HyperSwap protect device is hanging, an application that normally performs I/O operations to shared devices may be delayed. A disadvantage of delayed swapping may include, for example, an undesirable user experience caused by confusion regarding the delayed swap. Another example of a disadvantage that may occur due to a delayed swap is that it can expose existing or new timing windows, e.g., if a second sysplex is down before swapping, a mix of PPRC primary and secondary devices within their configuration may require manual intervention to repair. Another potential disadvantage of delayed swapping is that a user may be unable to initiate cleanup activities such as restarting mirroring from a second storage site to a first storage site until all sysplexes have swapped to the second storage site.

One or more embodiments provide for a method of automatically swapping of storage devices in a multiple computing cluster environment based on a command, such as a channel command word (CCW), from host devices on one computing cluster (e.g., a sysplex) to communicate to the computing clusters sharing the same storage devices that a swap is occurring. In a particular embodiment, when any computing cluster performs a planned or unplanned swap event, the computing cluster sends a new command called a Set Swap Trigger to the source storage devices and the target storage devices to indicate that a swap is occurring. In a particular embodiment, a storage controller associated with the storage devices reacts to the Set Swap Trigger command and raises a summary unit check event to all attached host devices. A summary unit check events triggers the storage devices returning their current states. Each host device detects the summary unit check event for the Set Swap Trigger, and triggers unplanned an HyperSwap operation if the event affects a HyperSwap primary storage device and a swap is not already active. In a particular embodiment, as an alternative to the summary unit check, an attention interrupt is sent by the storage controller and the host devices read the attention interrupt, for example using a Read Subsystem Data for Message Buffer.

In an embodiment, each sysplex issues a command to one or more storage devices involved in a swap with an indication that a swap event should be triggered. A storage controller for the one or more storage devices reacts to the command and raises signals to all attached hosts to trigger an unplanned swap operation. In a particular embodiment, the command is used on a LSS basis. In a particular embodiment, the storage devices in the LSS undergoing the swap are identified using a device bitmap supplied with the command.

With reference now to FIG. 1, FIG. 1 sets forth an example computing environment according to aspects of the present disclosure. Computing environment 100 contains an example of an environment for the execution of at least some of the computer code involved in performing the various methods described herein, such as swap management module 107. In addition to swap management module 107, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and swap management module 107, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Such computer processors as well as graphic processors, accelerators, coprocessors, and the like are sometimes referred to herein as a processing device. A processing device and a memory operatively coupled to the processing device are sometimes referred to herein as an apparatus. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document. These computer readable program instructions are stored in various types of computer readable storage media, such as cache 121 and the other storage media discussed below. The program instructions, and associated data, are accessed by processor set 110 to control and direct performance of the computer-implemented methods. In computing environment 100, at least some of the instructions for performing the computer-implemented methods may be stored in swap management module 107 in persistent storage 113.

Communication fabric 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in swap manage- ment module 107 typically includes at least some of the computer code involved in performing the computer-imple- mented methods described herein.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even con- nections made through wide area networks such as the internet. In various embodiments, UI device set 123 may include components such as a display screen, speaker, microphone, wearable devices (such as goggles and smart watches), keyboard, mouse, printer, touchpad, game con- trollers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database), this storage may be provided by peripheral stor- age devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer soft- ware, hardware, and firmware that allows computer 101 to communicate with other computers through WAN 102. Network module 115 may include hardware, such as modems or Wi-Fi signal transceivers, software for packetiz- ing and/or de-packetizing data for communication network transmission, and/or web browser software for communi- cating data over the internet. In some embodiments, network control functions and network forwarding functions of net- work module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable pro- gram instructions for performing the computer-implemented methods can typically be downloaded to computer 101 from an external computer or external storage device through a network adapter card or network interface included in net- work module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 rep- resents the machine(s) that collect and store helpful and useful data for use by other computers, such as computer 101. For example, in a hypothetical case where computer 101 is designed and programmed to provide a recommen- dation based on historical data, then this historical data may be provided to computer 101 from remote database 130 of remote server 104.

Public cloud 105 is any computer system available for use by multiple entities that provides on-demand availability of computer system resources and/or other computer capabili- ties, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically imple- mented by virtual computing environments that run on various computers making up the computers of host physical machine set 142, which is the universe of physical comput- ers in and/or available to public cloud 105. The virtual computing environments (VCEs) typically take the form of virtual machines from virtual machine set 143 and/or con- tainers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing envi- ronments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
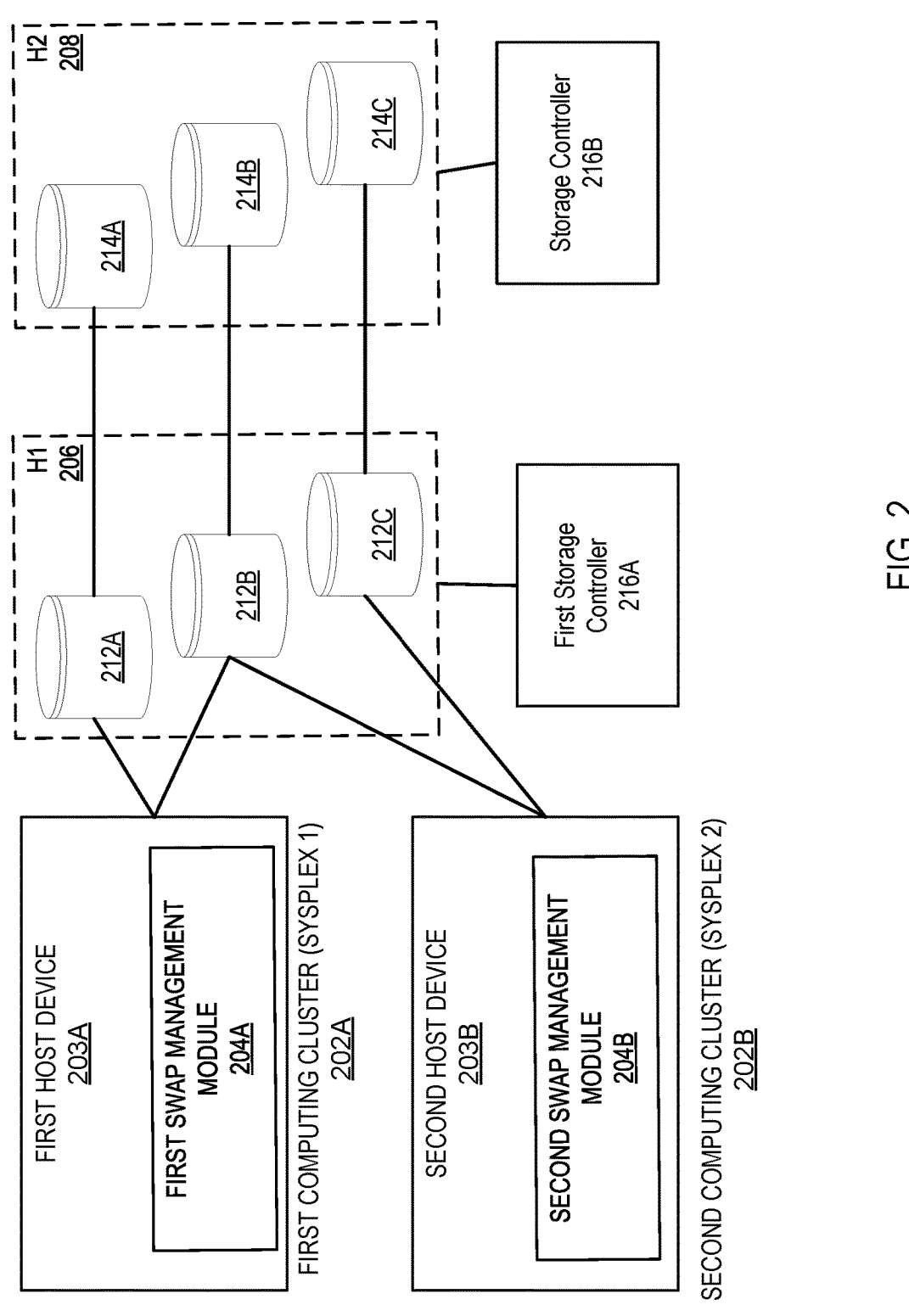
FIG. 2 sets forth another example computing environment according to aspects of the present disclosure.

Referring now to FIG. 2, FIG. 2 sets forth another example computing environment according to aspects of the present disclosure. Computing environment 200 includes a first computing cluster (Sysplex 1) 202A having a first host device 203A and a second computing cluster (Sysplex 2) 202B having a second host device 203B. In a particular embodiment, the first host device 203A and the second host device 203B includes the computer 101 described with respect to FIG. 1. The first host device 203A includes a first swap management module 204A and the second host device 203B include a second swap management module 204B. In a particular embodiment, the first swap management module 204A and the second swap management module 204B includes the swap management module 107 described with respect to FIG. 1.

The first computing cluster 202A and the second computing cluster 202B are each in communication with a set of source storage devices (or volumes)(H1) 206. In a particular embodiment, each of first computing cluster 202A and the second computing cluster 202B are in communication with the shared source storage device 212B via FICON connections. The set of source storage devices 206 are in communication with a set of target storage devices (or volumes) (H2) 208. In a particular embodiment, the set of source storage devices 206 are in communication with the set of target storage devices 208 via PPRC connections. In a particular embodiment, the set of source storage devices 206 and the set of target storage devices 208 are located at a different location or site. In one or more embodiments, each of the set of source storage devices 206 and the set of target storage devices 208 include one or more associated storage controllers (not shown). In one or more embodiments, the second computing cluster 202B is a foreign computing cluster in relation to the first computing cluster 202A.

The set of source storage devices 206 includes source storage devices 212A-212C in which source storage device 212A is a dedicated source storage device for the first computing cluster 202A, the source storage device 212C is a dedicated source storage device for the second computing cluster 202B, and the shared source storage device 212B is a shared source storage device by both the first computing cluster 202A and the second computing cluster 202B. The set of target storage devices 208 includes target storage devices 214A-214C in which target storage device 214A is a dedicated target storage device for the first computing cluster 202A, the target storage device 214C is a dedicated target storage device for the second computing cluster 202B, and the target storage device 214B is a shared target storage device by both the first computing cluster 202A and the second computing cluster 202B. The set of source storage devices 206 include a first storage controller 216A in communication with the first host device 203A and the second host device 203B for controlling the source storage devices 212A-212C. The set of target storage devices 208 include a second storage controller 216B in communication with the first host device 203A and the second host device 203B for controlling the target storage devices 214A-214C. Although various embodiments are illustrated using two computing clusters for simplicity of explanation, in other embodiments more than two computing clusters are used.

In an example operation, a need exists to perform a swap from the shared source storage device 212B of the shared source storage device 212B to the shared target storage device 214B of the set of target storage devices 208. In a particular embodiment, the shared source storage device 212B and the shared target storage device 214B are grouped as an LSS. The first host device 203A sends a swap trigger command to the shared source storage device 212B and the shared target storage device 214B indicating that a swap event is to be triggered. The swap trigger command includes information identifying the shared source storage device 212B and the shared target storage device 214B that are to participate in the swap event. In a particular embodiment, the information identifying the shared source storage device 212B and the shared target storage device 214B is a bitmap.

The first storage controller 216A reacts to receiving the swap trigger command by raising signals to the first host device 203A and the second host device 203B to trigger an unplanned swap event. In a particular embodiment, the signal to trigger the swap event is a summary unit check event. In another particular embodiment, the signal to trigger the swap event is an attention interrupt. The first host device 203A receives the signal to trigger the swap event from the first storage controller 216A, and triggers the swap event responsive to receive the signal.

Figure 3:
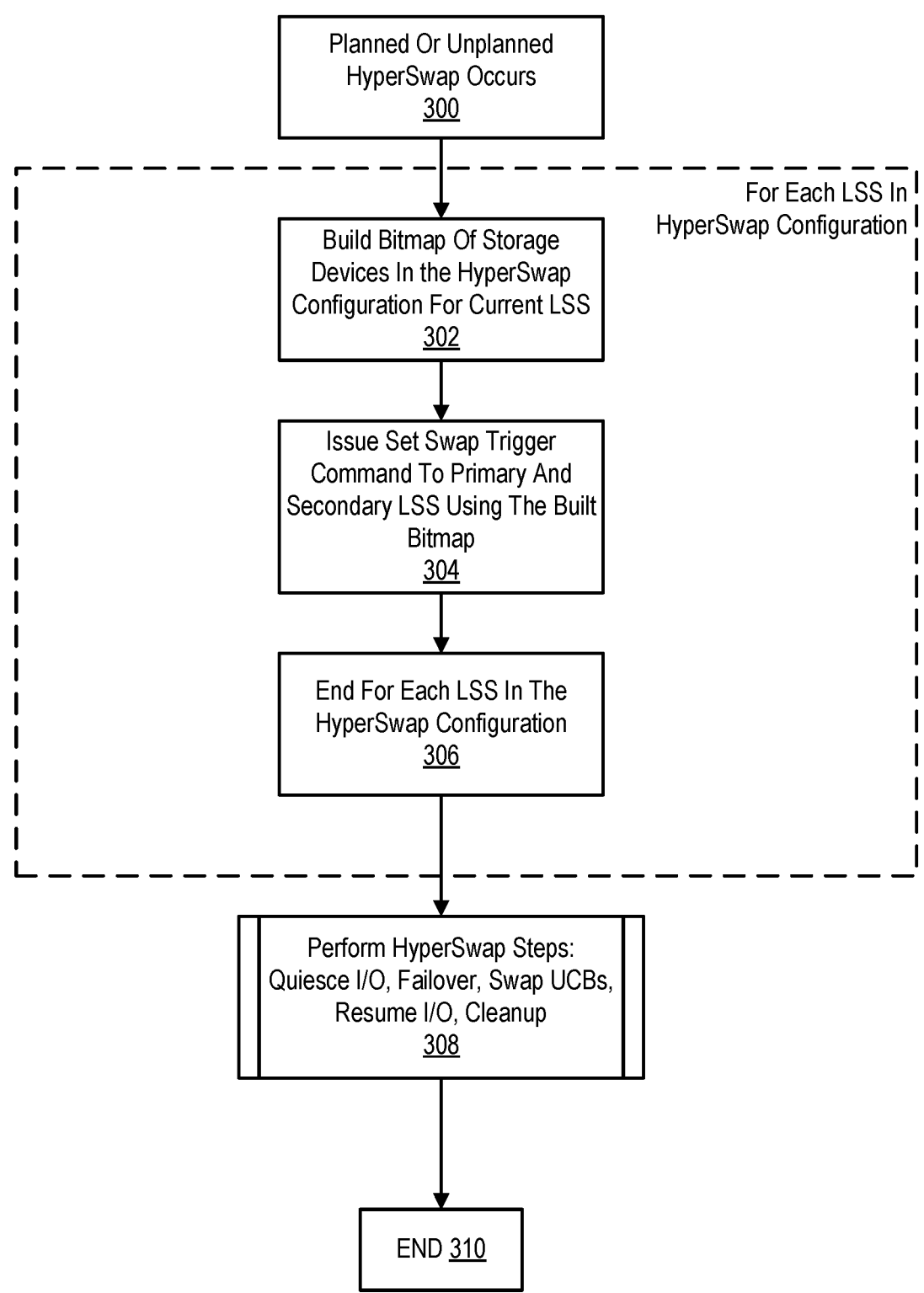
FIG. 3 sets forth a flowchart of an example process for host device swap processing according to aspects of the present disclosure.

Referring now to FIG. 3, FIG. 3 sets forth a flowchart of an example process for host device swap processing according to aspects of the present disclosure. When a planned or unplanned HyperSwap occurs 300, for each LSS in the HyperSwap configuration, a host device builds 302 a bitmap of storage devices in the HyperSwap configuration for the particular LSS. The bitmap identifies which of the storage devices in the current LSS are in the current HyperSwap configuration. The host device issues 304 a set swap trigger command the primary LSS and the secondary LSS using the built bitmap. The processing ends 306 for each LSS in the HyperSwap configuration.

The host device performs 308 the HyperSwap steps to complete the HyperSwap operation. In particular embodiments, the HyperSwap sets include quiescing of I/O operations, failover, swapping of unit control blocks (UCBs) in the HyperSwap identification array from primary to secondary, resuming of I/O operations, and cleanup operations. The process then ends 310.

Figure 4:
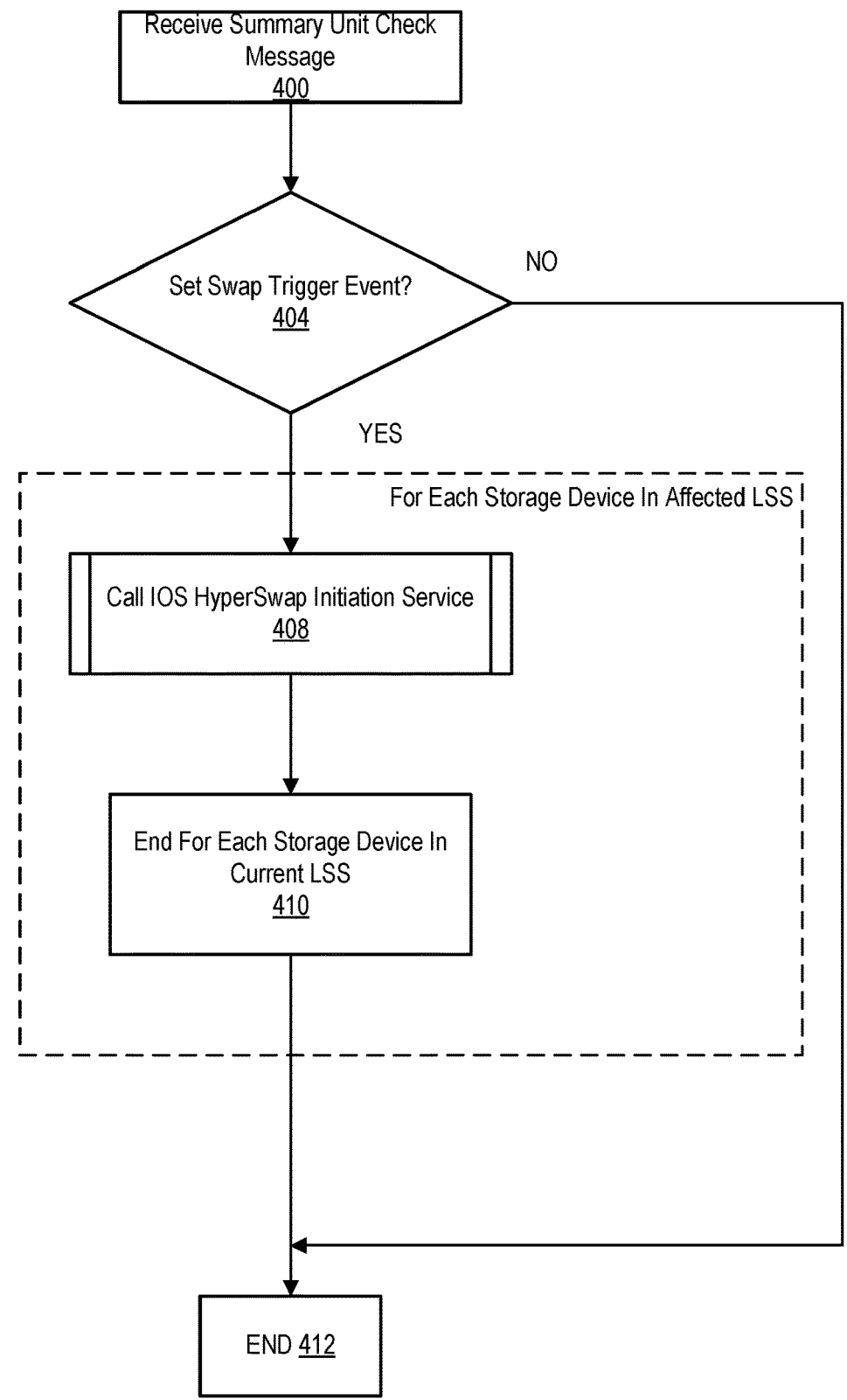
FIG. 4 sets forth a flowchart of an example process for host device summary unit check processing according to aspects of the present disclosure.

Referring now to FIG. 4, FIG. 4 sets forth a flowchart of an example process for host device summary unit check processing according to aspects of the present disclosure. The host device receives 400 a summary unit check message from a storage controller. The host device determines 404 whether to set a swap trigger event based on the summary unit check message. If no swap trigger event is to be set, the example process ends 412. If a swap trigger event is to be set, the host device calls 408 an IOS HyperSwap initiation service for each storage device in the affected LSS as further described with respect to FIG. 5 and the example process ends 410 for the current storage device in the affected LSS. Once all storage devices in the affected LSS have been evaluated, the example process ends 412.

Figure 5:
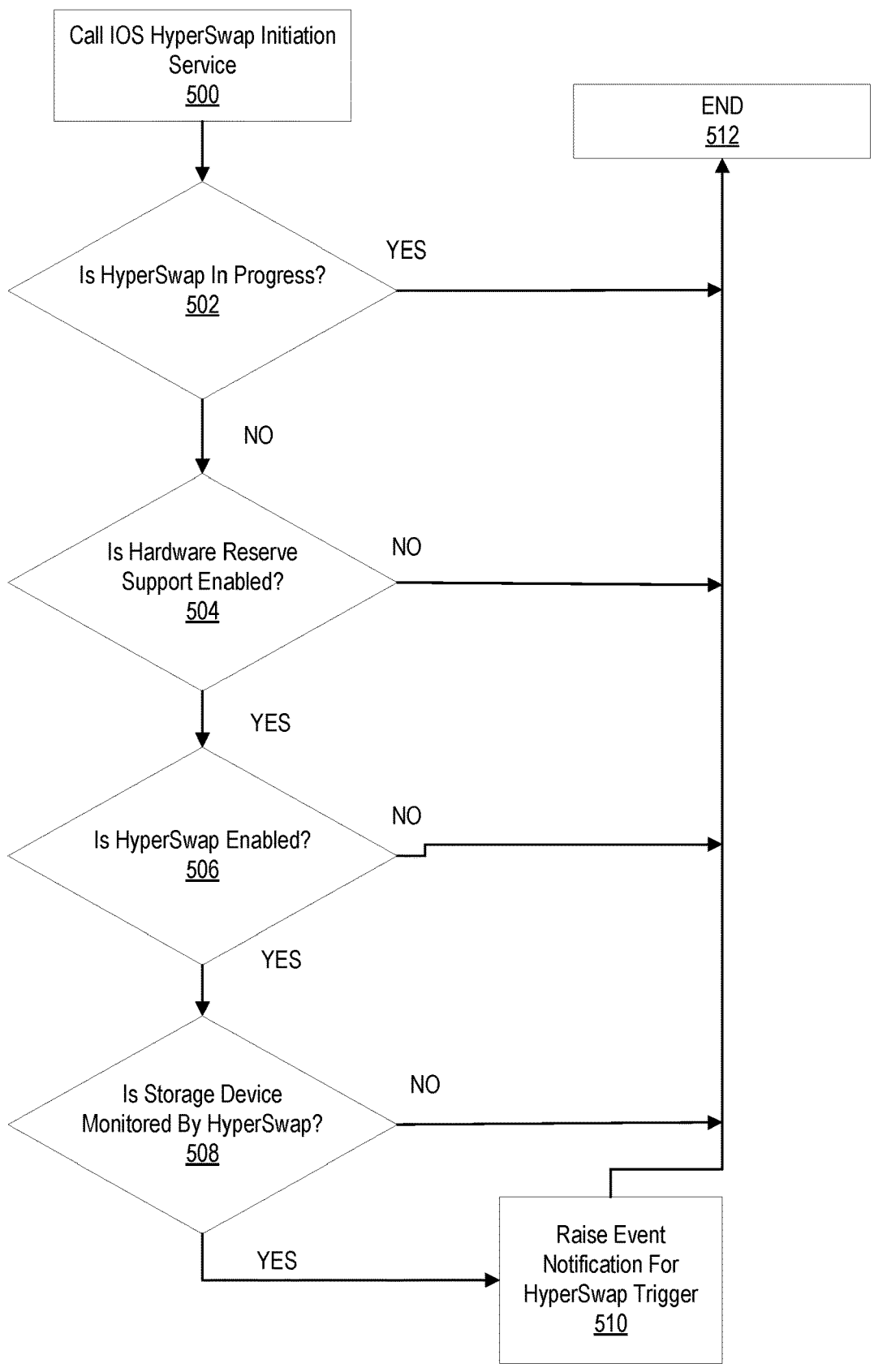
FIG. 5 sets forth a flowchart of an example process for host device swap service initiation according to aspects of the present disclosure.

Referring now to FIG. 5, FIG. 5 sets forth a flowchart of an example process for host device swap service initiation according to aspects of the present disclosure. During an IOS HyperSwap Initiation Service call 500, a host device determines 502 whether a HyperSwap operation is already in progress. If a HyperSwap operation is already in progress, the example process ends 512. If a HyperSwap operation is not already in progress, the host device determines 504 whether hardware reserve support is enabled. Enablement of hardware reserve support ensures that active hardware reserves on primary PPRC devices are properly transferred to a new primary device after a HyperSwap operation. If hardware reserve support is not enabled, the example process ends 512.

If hardware reserve support is enabled, the host device determines 506 if HyperSwap is enabled. If Hyperswap is not enabled, the example process ends 512. If HyperSwap is enabled, the host device determines 508 if the storage device is monitored by HyperSwap. If the storage device is not monitored by HyperSwap, the example process ends 512. If the storage device is monitored by HyperSwap, the host device raises 510 an event notification for HyperSwap trigger to initiate a HyperSwap operation and the example process ends 512.

Referring now to FIG. 6, FIG. 6 sets forth an example set swap trigger command 600 according to aspects of the present disclosure. The example set swap trigger command 600 includes a command field 602, a flags field 604, an action field 606, a first reserved field 608, a second reserved field 610, an LSS field 612, a third reserved field 614, and a device bitmap 616. The command field 602 identifies the set swap trigger command 600, and the action field 606 identifies an action (e.g., a swap) to be taken in response to receiving the set swap trigger command 600. The LSS field 612 identifies the LSS to be involved in the swap operation. The device bitmap 616 includes bit values indicating the storage devices to be involved in the swap operation. In a particular embodiment, the set swap trigger command 600 is issued to any device in an LSS, and the device bitmap 616 indicates the storage devices in the LSS that are affected by the HyperSwap event.

Referring now to FIG. 7, FIG. 7 sets forth a flowchart of an example process for storage device swap in a multiple computing cluster environment using cross system communication according to aspects of the present disclosure. In the example process of FIG. 7, a first host device of a first computing cluster of a plurality of computing clusters sends 702 a swap trigger command to one or more storage devices shared across the plurality of computing clusters indicating that a swap event is to be triggered. The swap trigger command identifies the one or more storage devices to participate in the swap event. In a particular embodiment, the swap trigger command includes a bitmap identifying the one or more storage devices to participate in the swap event.

In a particular embodiment, the one or more storage devices comprise a logical subsystem (LSS). In another particular embodiment, the one or more storage devices comprise a source storage device and a target storage device.

The first host device receives 704 a signal to trigger the swap event from a storage controller associated with the one or more storage devices. In a particular embodiment, the storage controller is configured to send the signal to trigger the swap event responsive to receiving the swap trigger command. In a particular embodiment, the signal to trigger the swap event is a summary unit check event. In another particular embodiment, the signal to trigger the swap event is an attention interrupt.

Referring now to FIG. 8, FIG. 8 sets forth a flowchart of another example process for storage device swap in a multiple computing cluster environment using cross system communication according to aspects of the present disclosure. The process of FIG. 8 is similar to the process described with respect to FIG. 7 and further includes triggering 802 the swap event responsive to receiving the signal to trigger the swap event. In a particular embodiment, the swap event comprises an unplanned swap event.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:

sending, by a first host device of a first computing cluster of a plurality of computing clusters, a swap trigger command to storage devices shared across the plurality of computing clusters, the storage devices including a source storage device and a target storage device, the source storage device and the target storage device storing redundant copies of data, the swap trigger command being sent to cause a storage controller, associated with the source storage device, to communicate to the plurality of computing clusters that a swap event is to be triggered for the storage devices shared across the plurality of computing clusters, the swap trigger command identifying the storage devices to participate in the swap event and being sent to prevent delayed swapping; and receiving, by the first host device from a storage controller associated with the storage devices, a signal to trigger the swap event, wherein the swap event is triggered responsive to receiving the trigger, and wherein the swap event causes a switch from using the source storage device to using the target storage device without manual intervention.

2. The method of claim 1, further comprising triggering the swap event responsive to receiving the signal to trigger the swap event.

3. The method of claim 1, wherein the swap trigger command includes a bitmap identifying the storage devices to participate in the swap event.

4. The method of claim 1, wherein the storage controller is configured to send the signal to trigger the swap event responsive to receiving the swap trigger command.

5. The method of claim 1, wherein the signal to trigger the swap event comprises a summary unit check event.

6. The method of claim 1, wherein the signal to trigger the swap event comprises an attention interrupt.

7. The method of claim 1, wherein the storage devices comprise a logical subsystem (LSS).

8. The method of claim 1, wherein the storage devices comprise a source storage device and a target storage device.

9. The method of claim 1, wherein the swap event comprises an unplanned swap event.

10. An apparatus comprising:

a processing device; and memory operatively coupled to the processing device, wherein the memory stores computer program instructions that, when executed, cause the processing device to:

send, by a first host device of a first computing cluster of a plurality of computing clusters, a swap trigger command to storage devices shared across the plurality of computing clusters, the storage devices including a source storage device and a target storage device, the source storage device and the target storage device storing redundant copies of data, the swap trigger command being sent to cause a storage controller, associated with the source storage device, to communicate to the plurality of computing clusters that a swap event is to be triggered for the storage devices shared across the plurality of computing clusters, the swap trigger command identifying the storage devices to participate in the swap event and being sent to prevent delayed swapping; and receive, by the first host device from a storage controller associated with the storage devices, a signal to trigger the swap event, wherein the swap event is triggered responsive to receiving the trigger, and wherein the swap event causes a switch from using the source storage device to using the target storage device.

11. The apparatus of claim 10, wherein the memory stores computer program instructions that, when executed, cause the processing device to trigger the swap event responsive to receiving the signal to trigger the swap event.

12. The apparatus of claim 10, wherein the swap trigger command includes a bitmap identifying the storage devices to participate in the swap event.

13. The apparatus of claim 10, wherein the storage controller is configured to send the signal to trigger the swap event responsive to receiving the swap trigger command.

14. The apparatus of claim 10, wherein the signal to trigger the swap event comprises a summary unit check event.

15. The apparatus of claim 10, wherein the signal to trigger the swap event comprises an attention interrupt.

16. The apparatus of claim 10, wherein the storage devices comprise a logical subsystem (LSS).

17. A computer program product comprising a computer readable storage medium, wherein the computer readable storage medium comprises computer program instructions that, when executed:

send, by a first host device of a first computing cluster of a plurality of computing clusters, a swap trigger command to storage devices shared across the plurality of computing clusters, the storage devices including a source storage device and a target storage device, the source storage device and the target storage device storing redundant copies of data, the swap trigger command being sent to cause a storage controller, associated with the source storage device, to communicate to the plurality of computing clusters that a swap event is to be triggered for the storage devices shared across the plurality of computing clusters, the swap trigger command identifying the storage devices to participate in the swap event and being sent to prevent delayed swapping; and receive, by the first host device from a storage controller associated with the storage devices, a signal to trigger the swap event, wherein the swap event is triggered responsive to receiving the trigger, and wherein the swap event causes a switch from using the source storage device to using the target storage device.

18. The computer program product of claim 17, wherein the computer program instructions, when executed, trigger the swap event responsive to receiving the signal to trigger the swap event.

19. The computer program product of claim 17, wherein the swap trigger command includes a bitmap identifying the storage devices to participate in the swap event.

20. The computer program product of claim 17, wherein the storage controller is configured to send the signal to trigger the swap event responsive to receiving the swap trigger command.

* * * * *